June 23, 1970     D. H. DANE     3,516,179
MECHANICAL SIMULATOR OF LOW GRAVITY CONDITIONS
Filed Jan. 26, 1968     4 Sheets-Sheet 1

INVENTOR.
DAN H. DANE
ATTORNEYS

June 23, 1970      D. H. DANE      3,516,179

MECHANICAL SIMULATOR OF LOW GRAVITY CONDITIONS

Filed Jan. 26, 1968      4 Sheets-Sheet 2

INVENTOR.
DAN H. DANE

BY

ATTORNEYS

INVENTOR.
DAN H. DANE

BY
ATTORNEYS

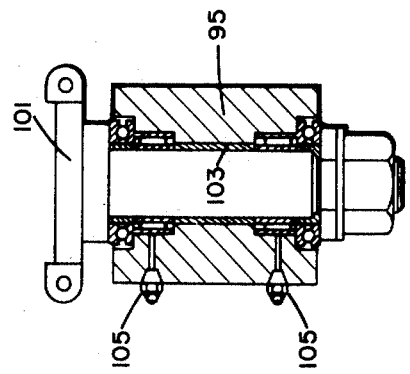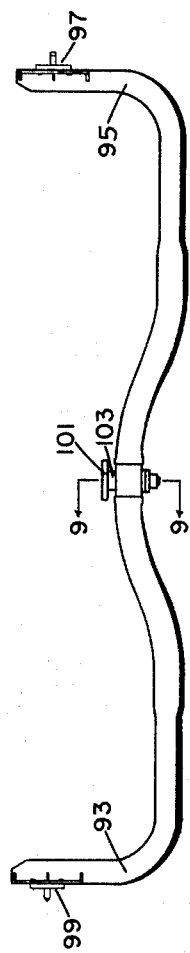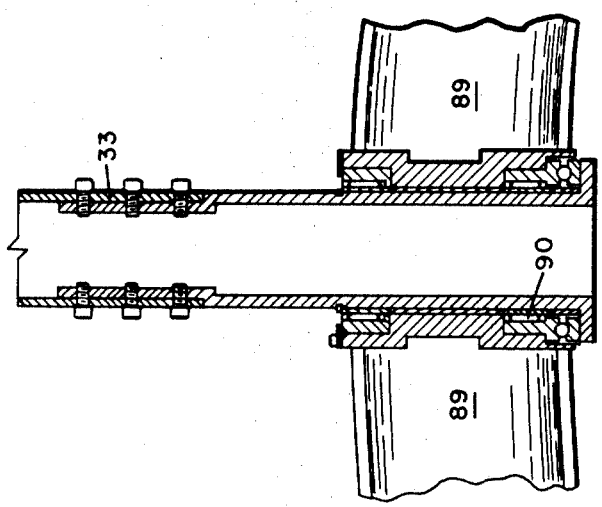

United States Patent Office 3,516,179
Patented June 23, 1970

3,516,179
MECHANICAL SIMULATOR OF LOW GRAVITY CONDITIONS
Dan H. Dane, Huntsville, Ala., assignor to the United States of America as represented by the Administrator of the National Aeronautics and Space Administration
Filed Jan. 26, 1968, Ser. No. 700,984
Int. Cl. B64g 7/00; G09b 9/00; E04h 12/34
U.S. Cl. 35—12       7 Claims

ABSTRACT OF THE DISCLOSURE

A mechanical simulator for giving a test subject such as an astronaut six-degree freedom of movement on the earth. A truss supported on air bearing pads is utilized to support an elongated column having at its lower end a yoke and beam arrangement which supports the test subject for pitch, yaw, and roll movements. The vertical movement of the elongated column is controlled by constant force springs attached to the truss.

BACKGROUND OF THE INVENTION

The invention described herein was made by an employee of the United States Government and may be manufactured and used by or for the Government for governmental purposes without the payment of any royalties thereon or therefor.

Field of the invention

The invention relates to an apparatus for simulation of low or no gravity conditions and more particularly to a mechanical support apparatus which allows a human to react to any force as he would in space.

Description of the prior art

It is often desirable to have a ground-type apparatus to enable an astronaut to become familiar with his tools and equipment while in a substantially weightless condition. To achieve the proper response, the apparatus should provide for complete freedom of movement. However, the most successful simulator, herebefore, lacked any vertical movement. Those simulators which did provide for full six degrees of freedom were of such massive construction that their response characteristics were poor. The heavy weight of these simulators increase the inertia of the system beyond the point of meaningful test results.

Accordingly, it is an object of the present invention to provide a ground base apparatus for supporting humans so that they will have the same reaction to a force as they would have in space.

Another object is to provide a full six degree of freedom simulator which has meaningful response characteristics.

Other and further objects, uses, and advantages of the present invention will become apparent as the description proceeds.

BRIEF DESCRIPTION OF THE INVENTION

The simulator of the present invention rests upon a platform supported on a floor. The platform has two spaced decks defining an opening therebetween through which a portion of the simulator supports the test subject for full six degree freedom of movement. A truss extends over the opening and is supported on the two opposed decks by air bearing pads. Slidably secured to the center of the truss is a vertical column like member. A semi-circle yoke is journaled at its center to the lower end of the vertical member. A support beam extends between and is rotatively secured to the opposed ends of the yoke. Midway between the ends of the support beam, a short shaft is journaled therein which has a mounting plate to which a harness assembly for a test subject is secured. Special spring means extend between the truss and the vertical member to counterbalance the weight of the vertical member and its load.

This will be more readily understood by the following detailed description when taken together with the accompanying drawings.

BRIEF DESCRIPTION OF THE DRAWINGS

FIG. 7 is a cross-sectional view of the rotative joint between the vertical support member and yoke;

FIG. 8 is an enlarged view of the main beam support; and

FIG. 9 is a cross-sectional view taken along line 9—9 of FIG. 8.

DETAILED DESCRIPTION OF THE PRESENTLY PREFERRED EMBODIMENT

Figure 1:
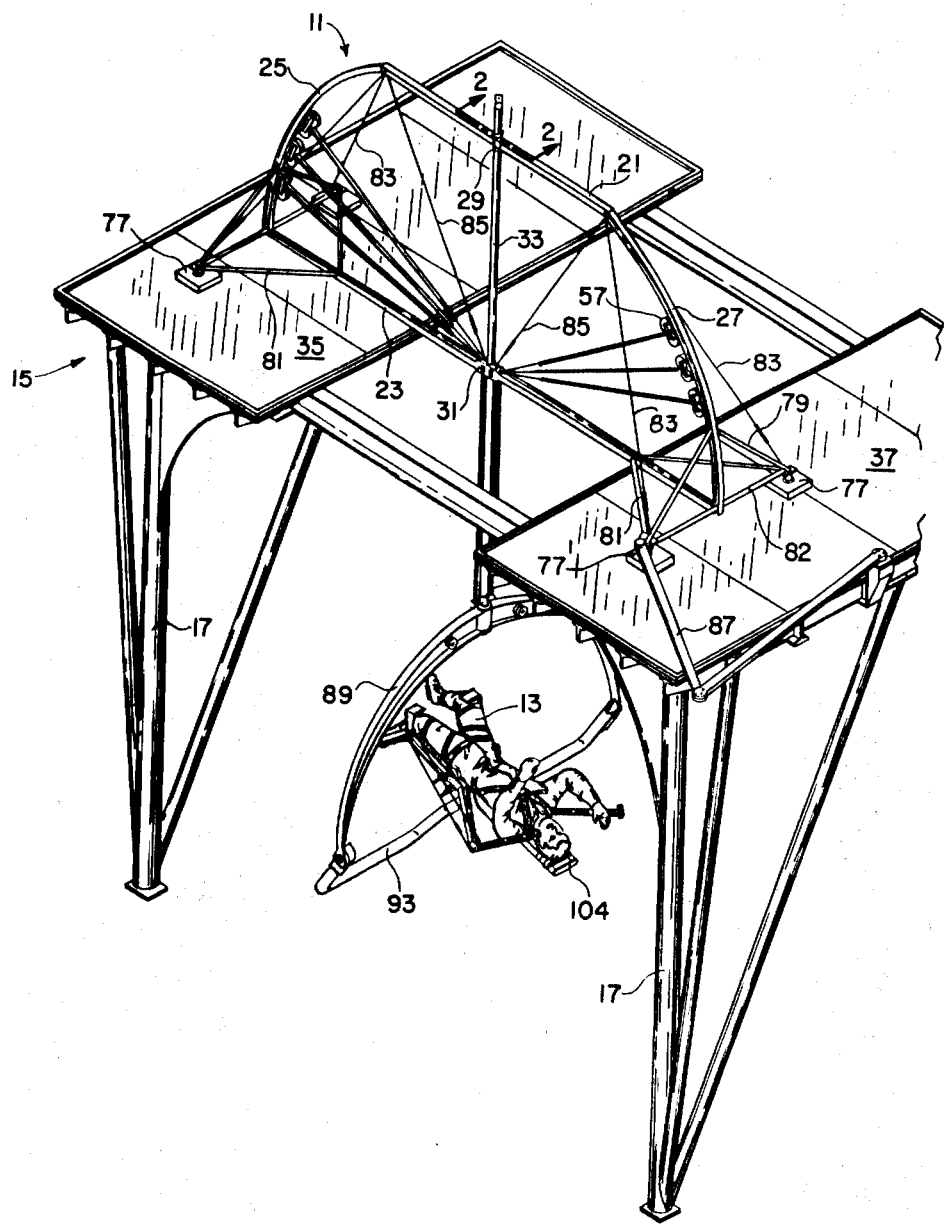
FIG. 1 is a perspective view of the mechanical support apparatus of the present invention.

Referring now to FIG. 1 wherein is illustrated the mechanical support apparatus 11 of the present invention which serves to simulate on a human 13 the effects of an applied force under low or no gravity. The simulator 11 rests upon a platform 15 which is supported from the floor by columns 17. The simulator 11 suspends the human test subject 13 within the space between the floor and platform 15 for full six-degree movement—vertical, lateral translation, longitudinal translation, pitch, roll and yaw.

A basic part of the simulator 11 is a truss framework having an upper beam 21 and a lower beam 23 extending between and joining two end arch members 25 and 27. The upper beam 21 consists of two portions joined together at the center of the truss by a square hollow juncture element 29. The lower beam 23 also consists of two portions joined together at the center of the truss 19 by a similar hollow juncture element 31. The juncture elements 29 and 31 are canted or rotated in reference to the beams 21 and 31 so their flat faces are at an angle to the longitudinal axis of the beams.

An elongated square tube member 33 extends vertically through the juncture elements 29 and 31. The tube member 33 serves as the sole support for the other portions of the simulator 11 which support the human test subject 13 and is adapted to move vertically in response to a vertical force on the test subject 13.

It should be noted that the platform 15 consists of two spaced decks 35 and 37 defining an opening therebetween. The vertical tube member 33 extends below the platform decks 35 and 37 through this opening.

Figure 2:
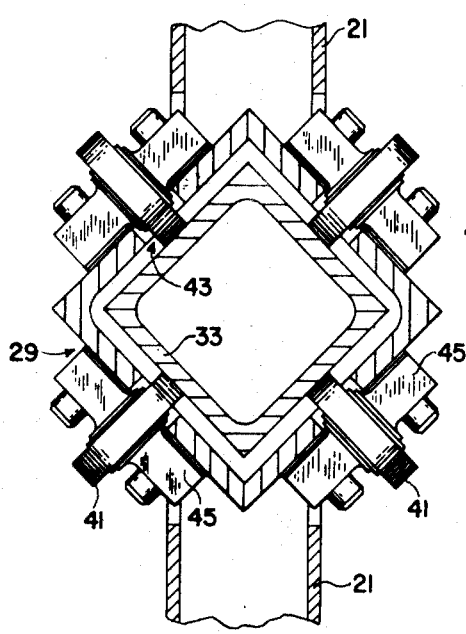
FIG. 2 is a cross-sectional view of the upper truss juncture element, taken along line 2—2 of FIG. 1.

As shown best in FIG. 2, the upper juncture element 29 has roller means for guiding the vertical support member 33 in its to and fro movements in response to forces acting on the test subject 13. A roller 41 extends through a slot 43 in each of the flat sides of the juncture element 29 and contacts a corresponding side or face of the vertical support member 33. Each roller 41 is journaled to an axle 45 and each axle 45 is secured to one of the corresponding sides of the juncture element 29.

Figure 3:
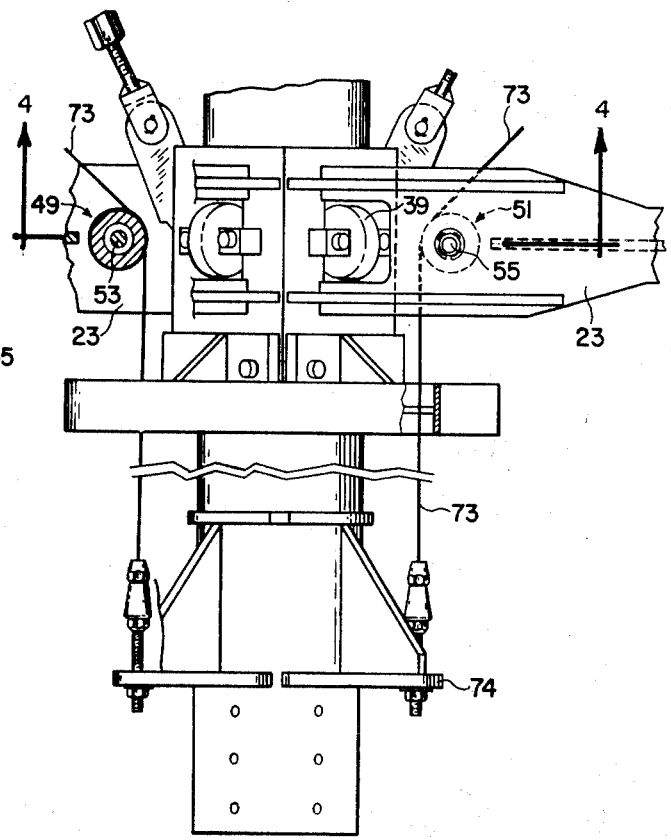
FIG. 3 is an enlarged view of the lower truss juncture element.
Figure 4:
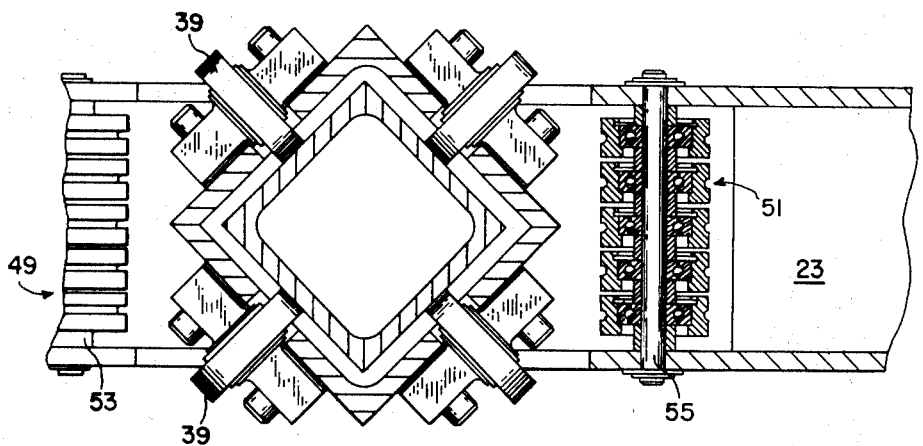
FIG. 4 is a cross-sectional view of the lower truss juncture element, taken along line 4—4 of FIG. 3, parts shown in whole for clarity.

The lower juncture element 31, as shown in FIGS. 3 and 4, has rollers 39, similar to the rollers 41 for the upper juncture 29, for guiding the vertical support member in vertical movements in a low friction manner. The lower beam 23 adjacent the lower junction element, however, has its center portion removed, and is secured to the lower juncture element by its two outside flanges. Two groups of pully wheels 49 and 51 are supported within the open portion of the beam 23, one group on each side of the juncture element. Each group of pulley wheels 49 or 51 is journaled on a single axle 53 or 55 which is secured to the two outer flanges of the beam 23.

Figure 5:
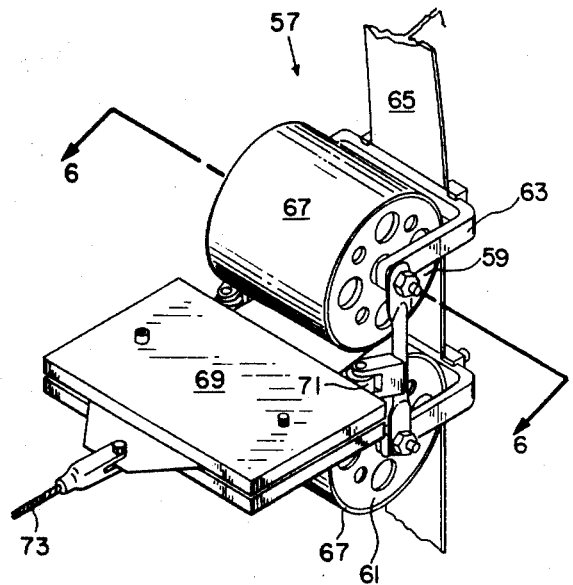
FIG. 5 is an enlarged view of the counterbalanced springs.
Figure 6:
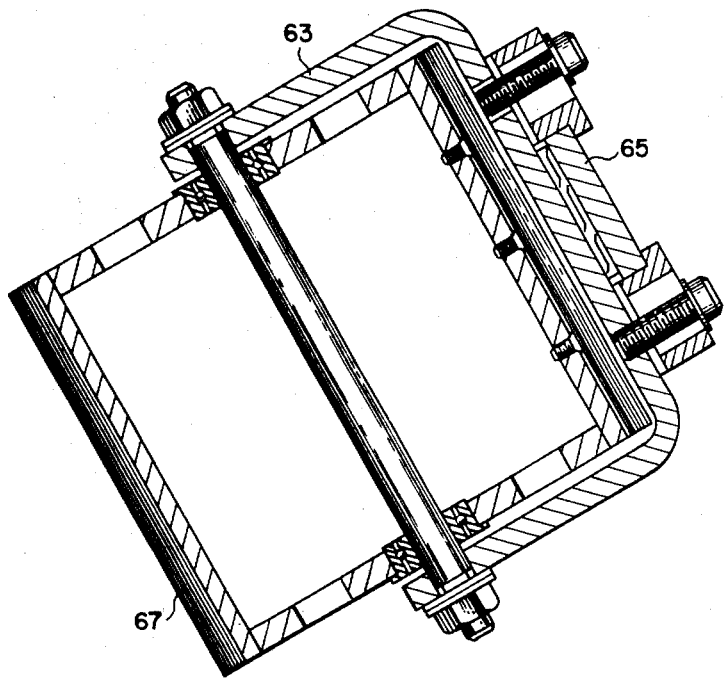
FIG. 6 is a cross-sectional view, taken along line 6—6 of FIG. 5.

As shown in FIG. 1, a plurality of "Negator" springs 57 are secured to the inside curvature of the end arches 25 and 27. Each Negator spring 57, as illustrated in FIGS. 5 and 6, consists of a pair of drums 59 and 61 rotatively supported by a frame 63 clamped to the inside flange 65 of the arch. Each drum 59 or 61 has a flat spring 67 rolled thereon which tends to maintain itself in a coiled condition and resist withdrawal from the coil with a force that remains substantially constant. The coiling torque, which opposes the uncoiling pull, is developed only by that section of the spring that is being straightened as it is drawn off the tight coil.

The front end of the springs 61 from each pair of drums 59 and 61 are fastened back-to-back by a holding clamp 69 so as to cancel out the inherent forces tending to twist the individual spring 67 as it is pulled from the drum 59 or 61. The drum frame 63 supports rollers 71 for guiding the flat spring 67 from the drums 59 and 61.

Attached to the front end of each pair of springs 57 is a single cable 73 which extends to its nearest pulley group 59 or 51, discussed in reference to FIG. 3, and is guided by that pulley group to the lower end of the vertical tubular member 33, as shown by FIG. 3 where it is attached to a collar 74 on the tubular member 33.

The force of the springs 57 attempting to retract onto the drums 59 and 61 counterbalances the weight of the vertical tubular member 31 and its associated equipment so as to allow vertical movement of the test subject 13 in response to the vertical component of any force acting on him. Additional or less Negator springs 57 may be added depending on the weight of the test subject 13.

It is well known that the substantially constant force exerted by the Negator springs 57 varies slightly as the radius of the rolled spring changes, and the radius of the succeeding layers of the rolled spring on the drum 59 and 61 differs according to the thickness of the spring 67. Thus, the spring 67 as it is pulled from the drum 59 or 61 keeps exerting a slightly stronger force. This stronger pulling force of the spring 67 is compensated for in the present invention by selecting the angle that the extended spring 57 makes with the horizontal in a manner that the weight of the extended spring 57 itself will have a force component substantially equal and opposite to the increase force of the spring.

The axle 53 or 55 of each group of pulleys, shown in FIG. 3, is located at the center of curvature of its nearest end arch 25 or 27 (see FIG. 1) whereby each Negator spring 57 will unwind or retract an equal amount as the vertical member 33 moves in a vertical manner.

The truss 11 as shown by FIG. 1, is supported at each end by a pair of air bearing pads 77 which will slide in a substantially frictionless manner over the surface of the decks 35 or 37. Each pad 77 is secured to the truss 11 by a vertical sloping pipe 79 extending from an end arch 25 or 27 and another pipe 81 extending horizontally outwardly from the lower beam 23 together with the pipe 82 which extends perpendicularly from the lower beam 23. Structural rods 83 and 85 extending from the top of the end arches 25 and 27 to the lower juncture element 31 and from the top of the arches 25 and 27 to the pipe members above the air bearing pads serve to rigidize the truss. If desired, a pivoted arm member 87 may be joined to the edge of the platform 15 and secured at its other end to an air bearing pad 77 to limit the overall movement of the truss 11 on the decks 35 and 37. The air bearing pads 77 receive air from a hose (not shown) which may be supported by the truss 11 in a manner that it will not interfer with its movements.

A yoke 89 in the form of a semi-circle is rotatively joined to the lower end of the vertical support 33, as illustrated best in FIG. 1, so as to rotate about the vertical axis of the vertical support 33. The cross-sectional view of FIG. 7 reveals the arrangement of the bearings 90 for the rotation joint between the yoke 89 and the vertical support 33.

Extending between the ends of the yoke 89 is the main support bar 91, which is shown enlarged in FIG. 8. The main support bar 91 is somewhat channel shaped with its two parallel ends 93 and 95 supporting pinions 97 and 99 which extend within the conventional roller bearings (see FIG. 1) on the ends of the yoke 89. Thus, main support bar 91 is adapted for rotation about the axis extending between the ends of the yoke 89.

At the center of the main suport bar 91 is the harness assembly mounting plate 101 which is secured to a short tubular shaft 103 extending perpendicular to the rotation axis of the main support bar 93. The short shaft 103 is journaled to the main support bar by the bearing assembly shown in FIG. 9. Grease fittings 105 are provided so that the bearings may be lubricated. The test subject harness assembly 104 is attached to the mounting plate 101 and is described in detail in copending patent application for "Harness Assembly," Ser. No. 723,476, filed Apr. 23, 1968, invented by Dan H. Dane, and assigned to the U.S. Government.

It is now apparent to one skilled in the art that a full six degree of freedom mechanical support apparatus 11 has been described which can be utilized to simulate low gravity or no gravity conditions upon a human test subject 13. The air bearing pads 77 provide for horizontal movement, the vertical tubular support 33 provides for all vertical movements, the yoke bearing 90 to the vertical support 33 provides for left and right yaw movements, the bearings between the yoke 89 and main support pipe 93 provide for up and down pitch movements, and the short shaft 103 journaled to the main support pipe 95 provides for left or right roll movements.

Obviously, many modifications and variations of the present invention are possible in light of the above teachings. It is, therefore, to be understood that within the scope of the appended claims, the invention may be practiced other than as specifically described.

What is claimed is:
1. A mechanical support apparatus, comprising:
a truss having two end members extending upwardly;
a vertical elongated member slidably connected to said truss for up and down movement, said elongated member being located approximately midway between said two end members;
said elongated member having a load carrying means adjacent its lower end;
a pair of spring means adapted to exert a substantially constant force, one spring means secured to each of said end members;
cable means for securing said elongated member to each said spring means whereby said spring means may counterbalance said elongated member and load thereon.
2. A mechanical support apparatus as defined by claim 1 wherein:
said framework has an upper and a lower beam extending between and secured to said end members;
each said end member being an inwardly curving arch;
a pair of pulley means secured to said lower beam, each pulley means adjacent said vertical elongated member and on each side thereof, for guiding said cable means from said spring means to the lower end of said vertical elongated member.

3. A mechanical support apparatus as defined by claim 2 wherein each said spring means comprises a pair of drums mounted on a frame, each drum having a flat spring rolled thereon which tends to maintain itself in a rolled condition so as to exert a substantially constant pulling force when pulled straight from the drum, said flat springs being adapted to be unrolled from said pair of drums in a back-to-back manner in accordance with the pull caused by said cable means.

4. A mechanical support apparatus as defined by claim 3 wherein each said spring means being adjustably positioned on an end member so that the change in pulling force caused by the different radius of any incremental length of the spring while in a coiled condition may be cancelled by the weight of the extended portion of the spring.

5. A mechanical support apparatus as defined by claim 1 wherein said load carrying means on the tower end of said vertical elongated member comprises:
a semi-circle yoke rotatively secured at its center to the lower end of said vertical elongated member;
a main support member extending between and rotatively secured to the ends of said semi-circle yoke;
a test subject support means having a short shaft journaled to said support member approximately midway of its ends.

6. A mechanical support apparatus as defined by claim 2 wherein said load carrying means on the lower end of said vertical elongated member comprises:
a semi-circle yoke rotatively secured at its center to the lower end of said vertical elongated member;
a main support member extending between and rotatively secured to the ends of said semi-circle yoke;
test subject support means having a short shaft journaled to said support member approximately midway of its ends.

7. A mechanical support apparatus as defined by claim 4 wherein said load carrying means on the lower end of said vertical elongated member comprises:
a semi-circle yoke rotatively secured at its center to the lower end of said vertical elongated member;
a main support member extending between and rotatively secured to the ends of said semi-circle yoke;
a test subject means having a short shaft journaled to said support member approximately midway of its ends.

References Cited
UNITED STATES PATENTS 3,449,843   6/1969   Richter et al. _____ 35—12

EUGENE R. CAPOZIO, Primary Examiner

P. V. WILLIAMS, Assistant Examiner

U.S. Cl. X.R.

52—111; 248—330